United States Patent [19]
Blincow et al.

[11] Patent Number: 5,509,622
[45] Date of Patent: Apr. 23, 1996

[54] PROTECTIVE COVER, RADIATION SHIELD AND TEST UNIT FOR HELICOPTER BLADE CRACK INDICATOR

[75] Inventors: Donald W. Blincow, Rancho Cucamonga; John J. Mahoney, San Bernardino; Jerold H. McCormick, Alta Loma, all of Calif.

[73] Assignee: General Nucleonics, Inc., Pomona, Calif.

[21] Appl. No.: 232,662

[22] Filed: Apr. 25, 1994

[51] Int. Cl.$^6$ .................................................. B64C 27/00
[52] U.S. Cl. ...................... 244/17.11; 416/61; 116/267; 73/38; 250/358.1
[58] Field of Search .............................. 244/17.11, 129.1, 244/1 R, 17.13; 416/61, 226; 116/DIG. 28, 266, 267, 272, 276; 340/416; 250/358.1, 303, 308; 73/729.1, 38

[56] References Cited

U.S. PATENT DOCUMENTS

| | | | |
|---|---|---|---|
| 4,010,708 | 3/1977 | Keledy et al. | 244/17.11 |
| 4,026,153 | 5/1977 | Silverwater | 116/267 |
| 4,499,846 | 2/1985 | Bergeron et al. | 116/272 |
| 4,651,670 | 3/1987 | Silverwater | 116/267 |
| 4,681,061 | 7/1987 | Dvorak et al. | 116/DIG. 28 |
| 4,867,095 | 9/1989 | Shane et al. | 116/267 |

*Primary Examiner*—Galen L. Barefoot
*Attorney, Agent, or Firm*—Harris, Wallen, MacDermott & Tinsley

[57] ABSTRACT

A cover for a pressure sensor for indicating cracks in a hollow aircraft blade, the sensor having a shaft carrying a radiation source, with the shaft sliding in a housing between a first position with the radiation source within the housing and a second position with the radiation source external of the housing, the cover including a sleeve for positioning around the sensor and having an open end for engaging a shoulder of the sensor and having a closed end spaced from the sensor when the open end is engaging the sensor shoulder, and a plunger slidably mounted in the closed end and movable between an outer position and an inner position, with the plunger out of engagement with the sensor shaft when in the outer position and engaging the sensor shaft when in the inner position to move the shaft into the sensor and reset the sensor, with the sleeve being of a material absorbing the radiation of the source.

6 Claims, 2 Drawing Sheets

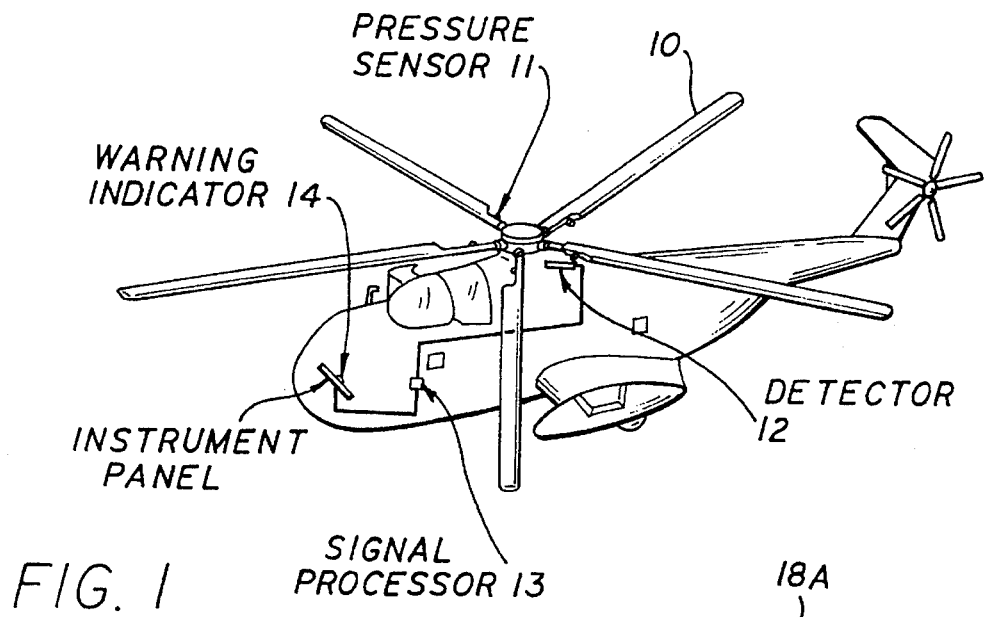
FIG. 1
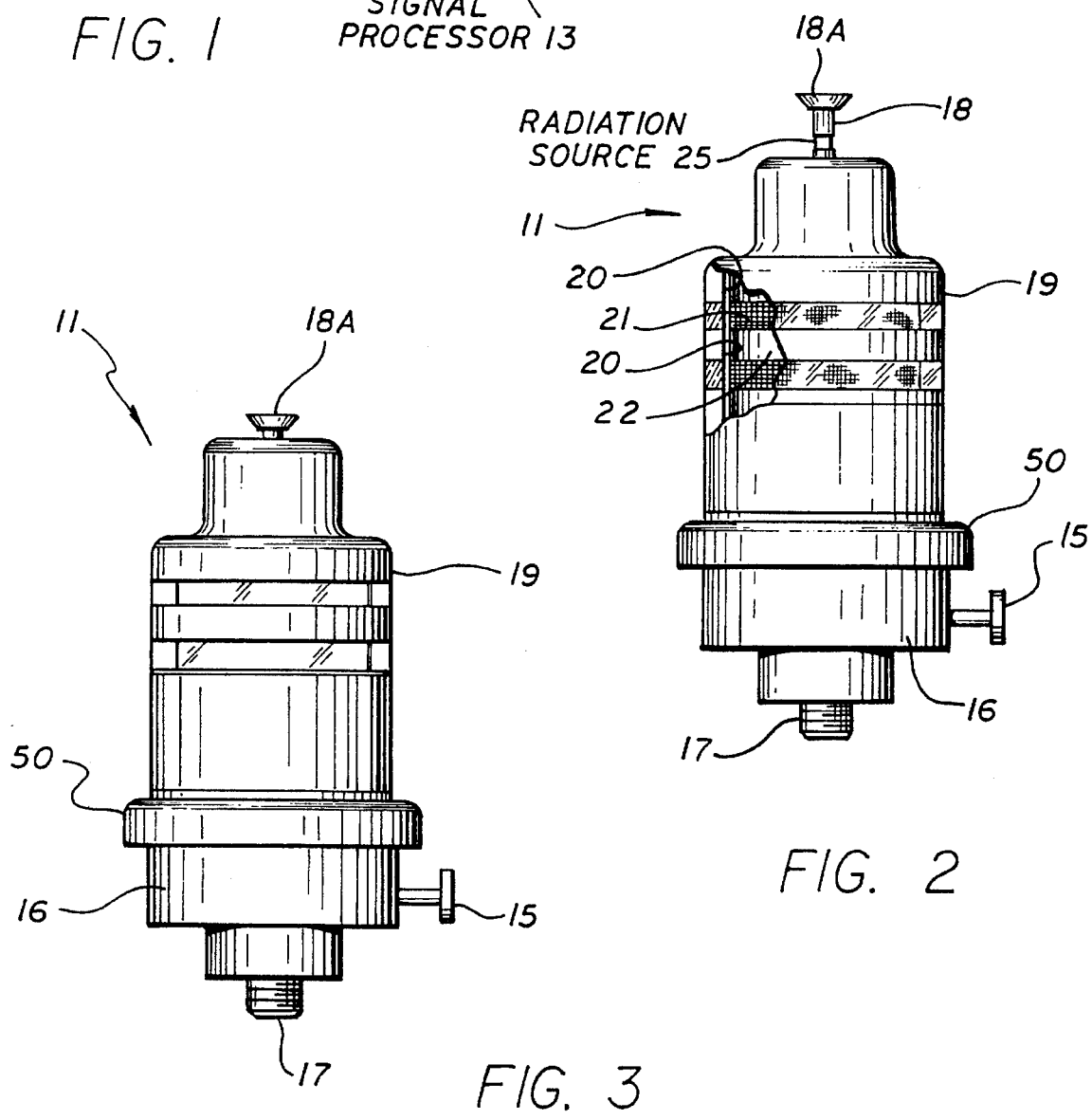
FIG. 2
FIG. 3

PROTECTIVE COVER, RADIATION SHIELD AND TEST UNIT FOR HELICOPTER BLADE CRACK INDICATOR

BACKGROUND OF THE INVENTION

This invention relates to aircraft blades and in particular, to a new and improved apparatus for use in continuously detecting cracks in propeller and helicopter rotor blades.

Aircraft blades are subjected to severe stress and occasionally develop minute cracks. It is of critical importance that the crack in the blade be detected at an early time so that the blade may be replaced preventing an inflight accident. A wide variety of methods are available for detecting cracks, including the making of x-ray pictures and the magnetic flux techniques. However, these require considerable equipment and can only be performed when the aircraft is at rest.

Another system provides a pressure differential in a sealed hollow blade, with the interior blade pressure being either above or below atmospheric. A pressure sensor is mounted on the blade and provides a visual indication of the pressure differential, with a drop in the differential indicating leakage due to a crack. This type of device provides for blade integrity measurement without requiring removal of the blade from the aircraft. However, the visual inspection can be performed only when the aircraft is on the ground. It has been suggested that the blade internal pressure could be transmitted to an indicator in the cockpit while the aircraft is in flight, utilizing a set of slip rings at the rotating hub for information transmission. However, slip ring systems present a number of problems. They are susceptible to dirt and grease, they are difficult to install and maintain, and they increase the cost and complexity of an already complex rotor shaft system.

An improved apparatus for continuously indicating the condition of hollow aircraft blades while the aircraft is in flight is shown in U.S. Pat. No. 3,985,318. This apparatus does not require any connection between the rotating blade and the remainder of the aircraft and can be utilized to give a go-no go indication for safe and warning conditions, and/or proportional type indications as a measure of pressure differential. The device is mounted on the blade and includes a shaft which moves as a function of pressure within the blade. A radiation source is carried on the shaft and is moved between shielded and unshielded positions.

However, the radiation source is always within the housing, which reduces the sensitivity of the overall system.

In an improved version now in use, the moving member which carries the radiation source has an extension which projects above the housing, with the radiation source carried on this extension. When the instrument is in the safe or reset condition, the portion of the moving member carrying the radiation source is within the housing, which serves as a shield for the radiation. When the instrument is indicating an unsafe condition, such as a low pressure within the blade resulting from leakage through a crack, the moving member is moved outward exposing the radiation source. With this arrangement, the magnitude of the radiation source necessary for operation is less than that required for the earlier design where the radiation source was always within the housing.

A cover or shield is provided for the instrument when the aircraft is not in use. A typical cover is a sleeve closed at the upper end for sliding downward over the instrument, with the closed end of the sleeve engaging the projecting member to push on and maintain the projecting member in the safe or reset position. However problems have been encountered with this construction, with significant damage to the instrument when the cover is not carefully utilized.

Accordingly, it is an object of the present invention to provide a new and improved cover for a helicopter blade crack indicator, which cover functions as a protective cover, a radiation shield, and a test unit for the indicator.

Other objects, advantages, features and results will more fully appear in the course of the following description.

SUMMARY OF THE INVENTION

In the apparatus of the present invention, a hollow aircraft blade is sealed with a pressure differential with respect to the ambient atmosphere. A reduction in the pressure differential within the blade is detected by a pressure sensor mounted on the blade. The pressure sensor moves a member between a first position for a higher differential pressure and a second position for a lower differential pressure. A radiation source is carried on the moving member and is moved from a shielded position for the higher differential to an unshielded position for the lower differential. A radiation detector is mounted in a fixed location on the aircraft and provides an output indicating when the moving member of the pressure sensor has moved the source to the unshielded position, thus indicating a reduction in the pressure differential resulting from a crack in the blade. Both go-no go and proportional type circuitry may be utilized for processing the radiation detector output to provide various types of indications as desired.

The moving member projects upward from the housing of the instrument, with the radiation source carried on the moving member. The invention specifically is a combination protective cover, radiation shield, and test unit for use with the pressure sensor.

The cover includes a sleeve for positioning around the sensor and having an open end for engaging a shoulder or stop of the sensor and having a closed end spaced from the sensor when the open end is engaging the sensor shoulder, and a plunger slidably mounted in the closed end of the sleeve and movable between an outer position and an inner position, with the plunger having an enlarged inner end and an enlarged outer end for retaining the plunger in the sleeve closed end, with the plunger out of engagement with the sensor shaft when in the outer position and engaging the sensor shaft when in the inner position to move the shaft into the sensor and reset the sensor, with the sleeve being of a material absorbing the radiation of the source.

BRIEF DESCRIPTION OF THE DRAWINGS

FIG. 1 illustrates a helicopter with the system of the invention installed therein;

FIG. 2 is a side view of the pressure sensor in the low pressure leak indicating condition with the radiation source exposed;

FIG. 3 is a view similar to that of FIG. 2 with the radiation source within the housing, in the safe or reset condition;

DESCRIPTION OF THE PREFERRED EMBODIMENT

Figure 4:
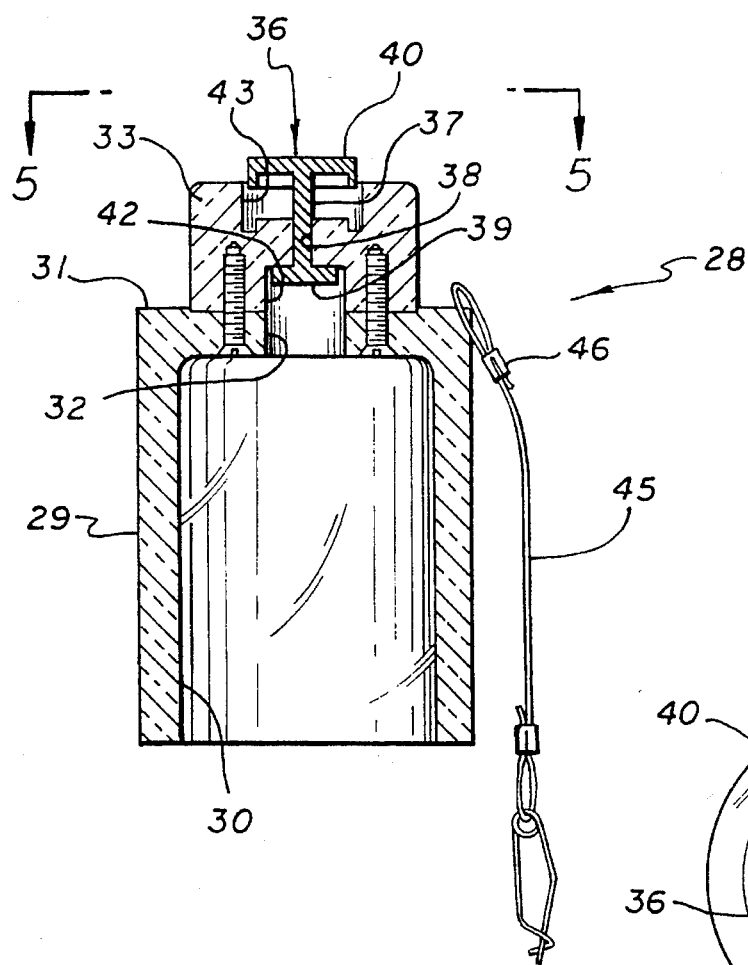
FIG. 4 is a vertical sectional view through the combination protective cover, radiation shield and test unit of the invention.

A conventional helicopter with a plurality of rotor blades 10 is shown in FIG. 1. A pressure sensor 11 with a radiation source is mounted on each of the blades. A radiation detector 12 is mounted on a fixed portion of the aircraft adjacent the rotating blades. The system also includes a signal processor 13 containing the electronic circuitry, and a warning indicator 14 for mounting on the instrument panel of the aircraft. A typical electronic circuit for the sensor is shown in said U.S. Pat. No. 3,985,318.

A typical pressure sensor 11 is shown in greater detail in FIGS. 2 and 3. The pressure sensor includes a housing 16 with a threaded boss 17 for mounting the sensor in a threaded opening in the wall of the blade 10. The sensor also includes a moving member 18 carried within the housing 16 and enclosed by a top 19.

The hollow rotor blade 10 is sealed with a pressure differential with respect to the ambient atmosphere. In one arrangement, the pressure within the blade may be 10 psi greater than atmospheric, this arrangement normally being referred to as a pressure system. In another arrangement, the pressure within the blade may be 10 psi below atmospheric, this arrangement normally being referred to as a vacuum arrangement. When the desired pressure differential is maintained, the moving member 18 remains in a first position, such as the in-board position shown in FIG. 3. When the pressure differential drops, the member 18 moves outward toward the position shown in FIG. 2. Various conventional pressure sensors may be utilized, one such unit being a Trodyne Corporation Model 1235 indicator constructed substantially as shown in U.S. Pat. No. 4,010,708. A push button 15 carried on the housing 16 provides for manual testing of operation of the system. When the push button 15 is depressed, atmospheric pressure is substituted for the interal pressure of the blade and if the pressure sensor is working, the member 18 will move appropriately.

In the conventional pressure indicator, the top 19 is a clear material such as a molded plastic and is provided with opaque white bands 20 on the inner surface. The member 18 is provided with alternating black and white bands 21, 22, respectively, and the bands 20–22 are disposed so that when the desired higher pressure differential is maintained, the pressure sensor presents an all white appearance to an external viewer as shown in FIG. 3. When a lower differential pressure exists and the member 18 moves to the position of FIG. 2, alternating black and white bands are presented to the viewer.

In the system of the invention, a radiation source 25 is mounted on a shaft of the member 18 adjacent the outer end 18a. The top 19 of the cover is of such a material and thickness that, under normal operating conditions as shown in FIG. 3 the top absorbs essentially all the radiation from the source, serving as a shield.

Examples of suitable radiation sources are Strontium 90 and Americium 241. A beta source is preferred because the beta radiation is absorbed in about 2 meters of air, thereby reducing the danger of radiation to personnel.

Figure 5:
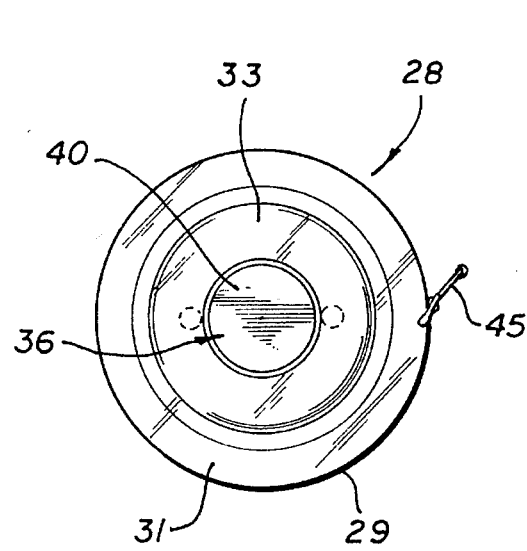
FIG. 5 is a top view of the cover of FIG. 4.
Figure 6:
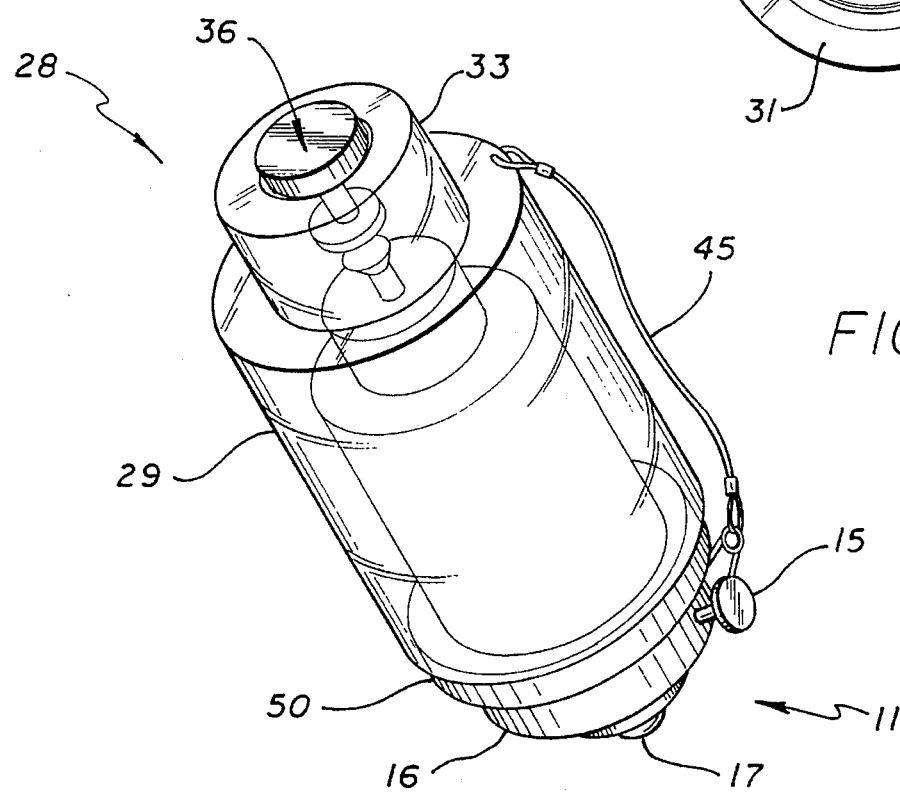
FIG. 6 is a view similar to that of FIG. 2 with the cover in position on the sensor.

A cover 28 for the indicator is shown in FIGS. 4 and 5, and is shown positioned on the indicator in FIG. 6 with the indicator in the low pressure or leak indicating condition of FIG. 2.

The cover 28 includes a sleeve 29 with an open end 30 for fitting over the top 19 of the pressure sensor instrument. The opposite end 31 of the sleeve is partially closed, with a central opening 32. A cover extension 33 is attached to the end, by screws 34 as shown in FIG. 4. Alternatively, the cover and cover extension could be produced as a single piece.

A plunger 36 has a central shaft 37 which slides freely in a passage 38 in the cover extension 33. The shaft 37 has an enlarged inner end 39 and an enlarged outer end 40 which retain the plunger in the cover extension. Typically, one of the ends of the plunger is threaded onto the shaft in order to assemble the plunger in the cover extension.

In the preferred embodiment illustrated, there is an opening 42 in the cover extension in line with the opening 32, and another opening 43 in the outer end of the cover extension for receiving the outer end 40 of the plunger. A retainer cable 45 may be attached to the cover 28, as by having the end of the cable pass through an opening in the cover, with a cable clip 46 on the free end of the cable 45.

The sleeve 29 is dimensioned so that it will slide over the top 19 of the instrument housing 16, with the end 30 of the sleeve resting on the shoulder 50 of the instrument. The plunger 37, the sleeve 29 and the openings 32, 42, 43 in the cover and cover extension are dimensioned so that the upper end 18a of the shaft 18 will fit in the openings 32, 42 and not engage the inner end 39 of the plunger when the cover is in place on the instrument and the instrument is in the low pressure condition of FIG. 2. With this arrangement, the cover provides physical protection for the instrument for both states of the instrument operation.

The cover and cover extension are made of a material, typically a clear plastic, which will absorb the radiation from the source 25 so that there is no radiation externally to the cover and cover extension, regardless of the state of the instrument.

Further, the cover with cover extension provides for testing and resetting of the instrument with the cover in place. The instrument is tested by pushing in the button 15 which admits atmospheric air, simulating a leak in the propeller blade. This causes the shaft 18 to move outward from the position of FIG. 3 to the position of FIG. 2 latching the shaft in the warn position. The instrument is then reset by pushing inward on the outer end 40 of the plunger. The amount of travel and hence the amount of pressure which can be applied to the instrument during resetting is limited by engagement of the outer end of the plunger 40 with the bottom of the opening 43 in the cover extension.

Thus it is seen that the cover functions as a protective cover for the instrument at all times when the instrument is not in use, functions as a radiation shield when the instrument is in the warn state, and also functions as a test unit for resetting the instrument after testing.

We claim:

1. In a cover for protecting and resetting a pressure sensor for use when the sensor is not in service, the sensor providing for indicating cracks in a hollow aircraft blade, the sensor having a shaft carrying a radiation source, with the sensor shaft sliding in a sensor housing between a first position with the radiation source within the housing and a second position with the radiation source external of the housing, the improvement in the cover comprising:

a sleeve for slidably positioning around the sensor housing and removing from the sensor housing, said sleeve having an open end for engaging a stop of the sensor and having a closed end spaced from the sensor out of engagement with the sensor when said open end is engaging said sensor stop; and a plunger slidably mounted in said closed end of said sleeve and movable between an outer position and an inner position, said plunger and sleeve having interengaging means for retaining said plunger in said sleeve closed end, with said plunger out of engagement with the sensor shaft when in said outer position and engaging the sensor shaft when in said inner position to move the sensor shaft manually into the sensor and reset the sensor;

with said sleeve being of a material absorbing the radiation of the source.

2. A cover as defined in claim 1 wherein said plunger includes a plunger shaft 37 with an enlarged inner end and an enlarged outer end with said plunger shaft sliding in an axial passage in said sleeve.

3. A cover as defined in claim 2 wherein said sleeve includes means defining a first opening for slidingly receiving said plunger shaft inner end and means defining a second opening for slidingly receiving said plunger shaft outer end, with the bottoms of said first and second openings serving as stops for limiting movement of said plunger in said sleeve.

4. A cover as defined in claim 3 wherein said sleeve is formed in two pieces with a sleeve body and a sleeve extension, with said plunger shaft passage in said sleeve extension and with said first opening passing through said sleeve body into said sleeve extension.

5. A cover as defined in claim 4 wherein said plunger outer end and said sleeve second opening are dimensioned so that said plunger outer end is within said sleeve extension when said plunger outer end is engaging said second opening bottom.

6. A cover as defined in claim 3 wherein said plunger and sleeve are dimensioned so that said plunger inner end may be out of engagement with the sensor shaft when said cover is in position on the pressure sensor and the sensor shaft is in the second position.

* * * * *